United States Patent [19]

Ohashi et al.

[11] Patent Number: 5,369,064
[45] Date of Patent: Nov. 29, 1994

[54] SHAPED FIBROUS MATERIALS FOR FIBER-REINFORCED METALS

[75] Inventors: Takayuki Ohashi, Kanagawa; Kenichi Shibata, Tokyo; Junichi Ogawa; Mitsushi Wadasako, both of Kanagawa, all of Japan

[73] Assignees: Nichias Corporation, Tokyo; Nissan Motor Co., Ltd., Yokohama, both of Japan

[21] Appl. No.: 887,751

[22] Filed: May 27, 1992

[30] Foreign Application Priority Data

May 27, 1991 [JP] Japan ................... 3-149289

[51] Int. Cl.$^5$ .................. C04B 35/02; C04B 35/08
[52] U.S. Cl. .................. 501/95; 501/126; 501/127; 501/153; 264/56; 264/87; 264/DIG. 19; 428/688; 428/908.8
[58] Field of Search .............. 501/95, 126, 127, 153; 428/614, 688, 908.8; 264/63, DIG. 19, 87, 56

[56] References Cited

U.S. PATENT DOCUMENTS

| | | | |
|---|---|---|---|
| 3,785,838 | 1/1974 | Weidman | 501/133 |
| 3,795,524 | 3/1974 | Sowman | 501/95 |
| 4,737,326 | 4/1988 | Wirth et al. | 264/87 |

FOREIGN PATENT DOCUMENTS

241198 5/1990 European Pat. Off. .
17884 3/1991 Japan .

OTHER PUBLICATIONS

CA117(22):217580h Suganuma et al., "Nickel-Aluminum Matrix Composites Reinforced with Aluminum Particle/Fiber", Compos., Proc. Int. Conf. Compos. Mater., 8th Edition, vol. 3, 23E/1-23E/11, 1991.

*Primary Examiner*—Mark L. Bell
*Assistant Examiner*—Michael Marcheschi
*Attorney, Agent, or Firm*—Cushman, Darby & Cushman

[57] ABSTRACT

This invention relates to a shaped fibrous material for use in the manufacture of fiber-reinforced metals comprising a uniform mixture of ceramic fibers and aluminum borate whiskers. The invention also relates to a method for producing the shaped fibrous material comprising the steps of dispersing ceramic fibers and aluminum borate whiskers in a suitable solvent containing a binder to form a slurry, transferring the slurry into a suction molding, aspirating and dehydrating the slurry to form a shaped dehydrated fibrous material, and drying and firing the shaped dehydrated fibrous material to obtain the shaped fibrous material. The shaped fibrous material can be cast efficiently into a fiber-reinforced metal with a high yield. The thus produced fiber-reinforced metal has a high wear resistance combined with a very mild nature of attacking the mating member.

8 Claims, 1 Drawing Sheet

SHAPED FIBROUS MATERIALS FOR FIBER-REINFORCED METALS

BACKGROUND OF THE INVENTION

1. Field of the Invention

The present invention relates to a shaped fibrous material suitable for use in the manufacture of fiber-reinforced metals, commonly named FRMs. The invention also relates to a method of making the shaped fibrous material.

2. Description of the Related Art

Fiber-reinforced metals containing heat-resistant fibers exhibit far greater strength than their respective starting metals (not reinforced). Fiber-reinforced metals are used in aircraft, automobiles and other applications where lightweight high-performance materials are required.

Fiber-reinforced metals have been produced by a "powder metallurgical" process using a metal powder containing reinforcing heat-resistant fibers. Another method of producing fiber-reinforced metals is by a high-pressure casting process in which an assembly of reinforcing fibers is shaped into a suitable form (a shaped fibrous material), impregnated with molten metal at high pressure, and then cooled.

Conventionally shaped fibrous materials comprise whiskers of silicon carbide, silicon nitride, potassium titanate, aluminum borate, etc. or short fibers of alumina, aluminosilicate, etc. Two or more of these fibers can be used in combination (see Examined Japanese Patent Publication No. 17884/1991).

Shaped fibrous materials are difficult to manufacture commercially because many manufacturing requirements must be satisfied, including: the ease of molding fibers into a predetermined shape, the ease of casting metals using the shaped fibrous material (for example, the degree of deformation the shaped fibrous material experiences during casting), and the physical properties of the fiber-reinforced metals obtained. Conventional shaped fibrous materials need improvements in the above aspects.

For example, shaped fibrous materials comprising whiskers of silicon nitride or silicon carbide have satisfactory moldability, castability and reinforcing properties. However, the fiber-reinforced metals produced using these shaped fibers have a strong tendency to wear the mating member which is in sliding contact, also known as "the nature of attacking the mating member." Furthermore, these fibers are very expensive. For these reasons, the reinforcing shaped fibrous materials made of whiskers of silicon nitride and silicon carbide are of only limited use.

Shaped fibrous materials comprising whiskers of potassium titanate have unsatisfactory moldability and castability. Further, the fibers tend to react with molten aluminum alloy, providing fiber-reinforced metals that have inferior physical properties, such as wear resistance.

Shaped fibrous materials comprising aluminum borate whiskers seem advantageous because they have a lower cost than other ceramic whiskers. However, these fibers are not easy to mold and therefore have a high molding cost. Moreover, the quality of these fibers is not uniform.

Shaped fibrous materials comprising ceramic fibers, such as alumina fibers, are generally easy to mold and have sufficiently good compatibility with aluminum alloys to produce satisfactory cast fiber-reinforced metals. However, fiber-reinforced metals using these fibers have a strong nature of attacking the member.

SUMMARY OF THE INVENTION

An object of the present invention is to provide a shaped fibrous material, that has satisfactory moldability, castability and production properties, for use in the manufacture of fiber-reinforced metals having satisfactory physical properties. Such a shaped fibrous material is obtained by combining ceramic fibers with aluminum borate whiskers.

Another objective of the present invention is to provide a method for producing the shaped fibrous material. Such a method of producing the shaped fibrous material comprises the steps of dispersing ceramic fibers and aluminum borate whiskers in a suitable solvent containing a binder to form a slurry, transferring the slurry into a suction molding, aspirating and dehydrating the slurry to form a shaped dehydrated fibrous material, and drying and firing the shaped dehydrated fibrous material to obtain a shaped fibrous material.

DETAILED DESCRIPTION OF THE INVENTION

Figure 1:
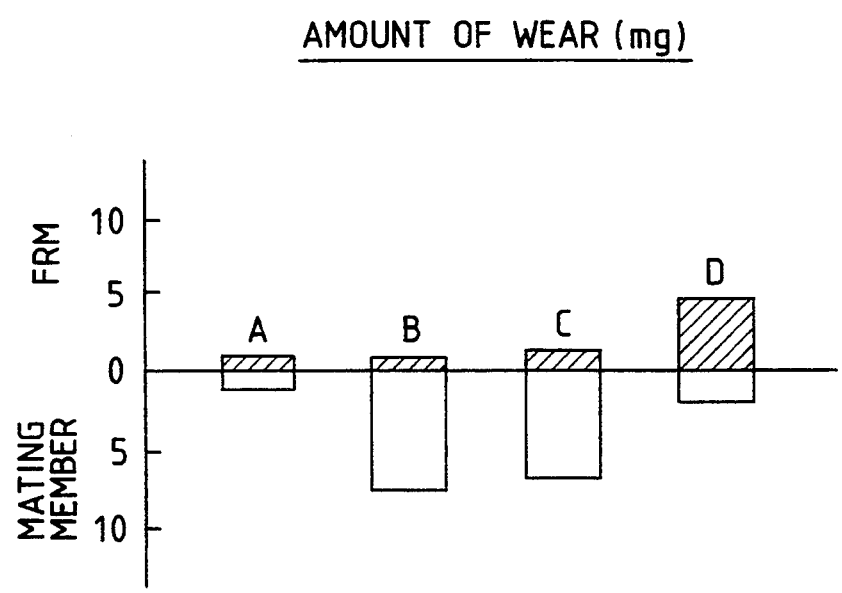
FIG. 1 is a graph showing the results of a wear test conducted on various samples of fiber-reinforced metal.

The shaped fibrous material for use in the manufacture of a fiber-reinforced metal comprises a uniform mixture of ceramic fibers and aluminum borate whiskers.

Alumina fibers are the most preferred of the ceramic fibers. Other examples of the ceramic fibers that can be used include zirconia and aluminosilicate fibers.

The preferred alumina fibers are "high-alumina" polycrystalline fibers that have an alumina content of at least ca. 85 wt %, and at least ca. 95 wt % being particularly preferred. Alumina fibers having an alumina content lower than ca. 85 wt %, such as aluminosilicate based fibers that have a high silica content, will sometimes bring about an undesirable result by reacting with a molten aluminum or aluminum alloy.

The ceramic fibers are short fibers that are preferably shredded to lengths of not more than ca. 1 mm. Such ceramic fibers of an extremely short length can be prepared by treating commercially available short ceramic fibers with a grinder or a powerful agitator so that they are cut to the desired shorter lengths. Commercially available ceramic fibers of short length that are customarily used in heat insulators, etc. typically range from several to fifty millimeters in fiber length.

The moldability of the shaped fibrous material deteriorates if a high proportion of the fibers have undesirably short lengths. Preferably, the proportion of fibers shorter than ca. 10 m should not exceed about 30 wt % of the total fibers.

The whiskers of aluminum borate are commercially available as fibers having the composition $9Al_2O_3 \cdot 2B_2O_3$, a fiber diameter of ca. 0.5–1.0 μm and a fiber length of ca. 10–30 μm (trade name "Alborex" manufactured by Shikoku Kasei Co., Ltd.). This commercial product may be directly used in the shaped fibrous material.

The ceramic fibers and the whiskers of aluminum borate are combined in proportions so that the ceramic fibers make up about 20–80% of the total mixture. If the proportion of ceramic fibers exceeds 80% of the total mixture, the resulting fiber-reinforced metal will exhibit a strong nature of attacking the mating member.

If the proportion of aluminum borate whiskers exceeds 80% of the total mixture, it will take an undesirably long time to dehydrate the mixture by suction in a molding step and it will be difficult to maintain the shape of a molded material. Further, the molded material will shrink by such a great degree upon drying that it will be difficult to insure a desired volume fraction of the fibers.

To produce the shaped fibrous material, the ceramic fibers and aluminum borate whiskers are dispersed in water and mixed uniformly in the presence of a small amount of binder. The resulting slurry is transferred into a suction mold and aspirated to dehydrate and shape the slurry.

A silica sol, an alumina sol, or the like, can be used as a binder.

The dehydrated and shaped slurry is dried and fired to produce a shaped fibrous material having satisfactory shape stability. The molding operation is desirably performed in such a way that the final volume fraction of the fibers will be ca. 5 to 40%.

The following example is provided for the purpose of further illustrating the present invention but is in no way limiting.

EXAMPLE 1

Short alumina fibers ($Al_2O_3$ content: 95 wt %), aluminum borate whiskers, a silica sol in an amount of 2 wt % of the sum of the fibers and whiskers, and 10 volumes of water were charged into a mixing vessel and stirred with an agitator at high speed to prepare a uniform dispersion. The resulting slurry contained alumina fibers shredded to an average fiber length shorter than 0.2mm.

A given amount of the slurry was charged into a cylindrical suction mold and aspirated from the underside of a filter plate. The slurry was dehydrated to yield a disk shaped material. The disk shaped material was removed from the mold, dried and fired at 1200° C for 1 hour to produce a shaped fibrous material. The shaping operation was conducted under such conditions that the asfired disk had a diameter of 100 mm, a thickness of 30 mm and a fiber volume fraction of 20%.

Seven samples of shaped fibrous materials were produced by above described process, with the ratio of the alumina fibers to the aluminum borate whiskers being varied from the range of 100:0 to 0:100.

Control shaped fibrous materials were prepared by the same method as described above except that short alumina fibers (95 wt % $Al_2O_3$) were combined with whiskers of silicon carbide, silicon nitride, potassium titanate or zinc oxide.

The samples thus prepared were evaluated for their moldability by the following criteria:

Rate of dehydration: The rate of dehydration V (the average rate at which the slurry was dehydrated during molding measured by the flow of solvent passing through a filter disk of 100 mm) was grouped in the following classes:

A V>2000 ml/min
B 1000 ml/min<V≦2000 ml/min
C 200ml/min<V≦1000ml/min
D V≦200 ml/min Quality of shaped material:

1 Satisfactory shape stability. No change upon drying or firing.
2 Somewhat poor shape retention needing care in handling.
3 Poor shape retention exhibiting substantial shrinkage upon drying.
Poor shape retention exhibiting substantial shrinkage upon drying and cracking upon firing.

The results are shown in table 1.

TABLE 1

| Starting fibers and their proportions (volume ratio) | Rate of dehydration | Quality of shaped material |
| --- | --- | --- |
| Short alumina fiber/ aluminum borate whisker | | |
| 100/0 | A | 1 |
| 80/20 | A | 1 |
| 60/40 | B | 1 |
| 50/50 | B | 1 |
| 40/60 | C | 2 |
| 20/80 | C | 3 |
| 0/100 | D | 3 |
| Short alumina fiber/ silicon carbide whisker | | |
| 50/50 | B | 1 |
| 0/100 | C | 2 |
| Short alumina fiber/ silicon nitride whisker | | |
| 50/50 | B | 1 |
| 0/100 | C | 2 |
| Short alumina fiber/ potassium titanate whisker | | |
| 50/50 | C | 2 |
| 0/100 | D | 4 |
| Short alumina fiber/ zinc oxide whisker | | |
| 50/50 | C | 2 |
| 0/100 | D | 4 |

The samples of shaped fibrous material were subjected to a high-pressure casting test in which they were composited with an aluminum alloy AC8A.

The casting process comprised the steps of preliminarily heating the shaped fibrous material to 800° C, placing the shaped material in a mold preheated to 300° C., injecting a melt of aluminum alloy AC8A at 750° C. into the mold, pressurizing the melt in the mold at 100 kg/cm$^2$, and cooling the melt to solidify the casting. The thus formed casting was removed from the mold and subjected to a heat treatment (T6).

The castability, tensile strength and wear resistance of the samples of fiber-reinforce metals thus obtained were evaluated by the following methods:

Castability: Disk-shaped casting was divided into two parts along a center line and the distribution profile of fibers in the cross section was examined and evaluated by the following criteria:

A The shaped fibrous material remained intact with uniform reinforcement of the metal.
B Fine cracks developed in the shaped fibrous material resulting in occasional clear metal phases not reinforced with the fibers.
C Large cracks developed in the shaped fibrous material resulting in elongated streaks of unreinforced metal.
D The shaped fibrous material deformed extensively from compression resulting in a large number of unreinforced metal phases.

Tensile strength: A test piece No. 7 JIS Z 2241 (width: 4 mm; gage distance: 10 mm; thickness: 1.5 mm) was cut in a radial direction and the tensile strength was measured at a tensile speed of 1 mm/min in accordance with the method specified in JIS Z 2201.

Wear resistance: A wear resistance test was conducted using a tester of the friction type (manufactured by Toyo Baldwin Col, Ltd.) with a high-speed steel, SKH9, being used as the mating member in sliding contact, under the following conditions:

| Load pressure: | 150 kgf/cm$^2$ |
| --- | --- |
| Friction speed: | 0.3 m/sec |
| Friction distance: | 5 km |
| Testing environment: | oil |

The results of the evaluation of castability and tensile strength are shown in Table 2 below.

TABLE 2

| Starting fibers and their proportions (volume ratio) | Castability | Tensile strength (kg/mm) |
| --- | --- | --- |
| Short alumina fiber/aluminum borate whisker | | |
| 100/0 | A | 32 |
| 80/20 | A | 33 |
| 60/40 | A | 35 |
| 50/50 | A | 37 |
| 40/60 | A | 38 |
| 20/80 | A | 40 |
| 0/100 | B | 42 |
| Short alumina fiber/silicon carbide whisker | | |
| 50/50 | A | 39 |
| 0/100 | B | 45 |
| Short alumina fiber/silicon nitride whisker | | |
| 50/50 | B | 38 |
| 0/100 | C | 43 |
| Short alumina fiber/potassium titanate whisker | | |
| 50/50 | D | 32 |
| 0/100 | D | 33 |
| Short aumina fiber/zinc oxide whisker | | |
| 50/50 | D | 32 |
| 0/100 | D | 33 |

The results of the wear test where the ratio of short alumina fibers to whiskers was 50:50 are shown in FIG. 1. In FIG. 1, A, B, C and D denote the following: A, the combination of short alumina fibers and aluminum borate whiskers; B, the combination of short alumina fibers and silicon carbide whiskers; C, the combination of short alumina fibers and silicon nitride whiskers; and D, the combination of short alumina fibers and potassium titanate whiskers.

As described in the foregoing pages, the shaped fibrous material can be cast efficiently into a fiber-reinforced metal with a high yield. The thus produced fiber-reinforced metal has a high wear resistance combined with a very mild nature of attacking the mating member.

Fiber-reinforced metals made from the shaped fibrous material of the present invention are satisfactory in every aspect of performance and therefore have a potential to be used in a much broader scope of applications than conventional fiber-reinforced metals.

Aluminum borate whiskers are available at a much lower cost than whiskers of other ceramics. Therefore, combined with the low price of ceramic fibers and the above-described ease of molding, the shaped fibrous material of the present invention can be produced at a lower cost than conventional shaped fibrous materials.

While the invention has been described in detail and with reference to specific embodiments thereof, it is apparent to one skilled in the art that various changes and modifications can be made therein without departing from the spirit and scope thereof.

What is claimed is:

1. A shaped fibrous material for use in fiber reinforced metal having increased resistance to mating member wear, said shaped fibrous material comprising a uniform mixture of:
   20% to 80% by volume of ceramic fibers compared to said uniform mixture; and
   20% to 80% by volume of aluminum borate whiskers compared to said uniform mixture, wherein a volume fraction of said ceramic fibers and aluminum borate whiskers after molding said shaped fibrous material is from about 5 to 40%.

2. A shaped fibrous material according to claim 1, wherein said ceramic fibers are short alumina fibers.

3. A shaped fibrous material according to claim 2, wherein said short alumina fibers have an Aluminum content of at least about 85 wt %.

4. A shaped fibrous material according to claim 3, wherein said alumina fibers have an Aluminum content of at least about 95 wt %.

5. A shaped fibrous material according to claim 1, wherein a length of said ceramic fibers is not more than about 1 mm.

6. A shaped fibrous material according to claim 5, wherein a proportion of said ceramic fibers less than about 10 μm in length is not greater than about 30 wt % of the total volume of fibers.

7. A method of making a shaped fibrous material comprising the steps of:
   dispersing ceramic fibers and aluminum borate whiskers in a suitable solvent containing a binder to form a slurry;
   transferring said slurry into a suction molding;
   aspirating and dehydrating said slurry to form a shaped dehydrated fibrous material; and
   drying and firing said shaped dehydrated fibrous material to obtain said shaped fibrous material.

8. A method of making shaped fibrous materials according to claim 7, further comprising grinding said ceramic fibers until the length of said ceramic fibers is not more than about 1 mm.

* * * * *